3,268,377
Patented August 23, 1966

3,268,377
EXTRUDABLE HEAT-RESISTANT PROPELLANTS CONTAINING POLYBUTADIENE-ACRYLONITRILE WITH TRIALLYL CYANURATE
Martin Visnov, Philadelphia, Pa., and James H. Godsey, Wilmington, Del., assignors, by direct and mesne assignments, to the United States of America as represented by the Secretary of the Army
No Drawing. Filed Jan. 13, 1965, Ser. No. 425,359
6 Claims. (Cl. 149—19)

The invention described herein may be manufactured and used by or for the Government for governmental purposes with the payment to us of any royalty thereon.

This invention relates to propellants and more particularly concerns improved heat-resistant propellants for use in propellant actuated device cartridges and the like.

In the field of propellant actuated devices an urgent need exists for propellants capable of resisting temperatures to at least about 350°–400° F. for periods of at least several hours and yet the propellant being readily capable of manufacture by extrusion by standard machinery into mono-perforated or multi-perforated gun-type grains. This need has become vitally urgent in recent years due to the need of such grains in the utilization by aircrafts, missiles, inter-planetary probes, and the like which require propellant actuated devices to encounter elevated temperatures from such sources as aerodynamic heating, proximity to heat producing devices or from sterilization processes.

In the past, thermal insulation or inferior heat-resistant compositions, or combinations of both, were used in an attempt to overcome the aforementioned problems. For example, the use of insulation adds unnecessary weight to the flying vehicle as well as taking up limited space facilities. Extrudable composite propellant compositions generally employed thermoplastic polymers which were capable of resisting elevated temperatures but suffered undesirable deformation above 300° F.

It is, therefore, a broad object of this invention to provide new, improved solid propellant compositions.

Another object of the invention is to provide propellant grains which are admirably resistant to heat and yet are readily and easily extrudable into varying geometries.

Still another object of the invention is to provide propellant grains which are capable of satisfactorily resisting temperatures approaching 400° F. for extended periods with only a minimal weight loss.

Other and further objects of the invention will be apparent to those skilled in the art upon study of this disclosure.

Now, in accordance with our present invention, new compositions of matter have been discovered which permit the achievement of the aforementioned objects in a simple and facile manner using manufacturing equipment such as those conventionally used in the manufacture of smokeless powder. Moreover, in conjunction with this conventional equipment, the compositions of matter of the present invention simply involve mixing, extruding, cutting, drying and curing with glazing, if desired, to produce the unique product of our invention.

More specifically, the present invention provides new compositions of matter having admirable heat-resistant qualities and comprises mixing our ingredients and adding an oxidizer thereto with a volatile solvent before extruding, granulating and drying. We have found that Hycar 1051, a copolymer of 60% butadiene and 40% acrylonitrile, having an empirical formula $C_{3.60}H_{4.80}N_{0.40}$, a product of B. F. Goodrich Co., Luperco ATC, a catalyst product of Wallace & Tiernan, Inc., comprising benzoyl peroxide and tricresyl phosphate and triallyl cyanurate, $C_{12}H_{15}O_3N_3$, when mixed with an oxidizer, potassium perchlorate or HMX, for example, yield products which admirably resist elevated temperatures for extended periods and yet are readily and easily extrudable into mono-perforated and multi-perforated geometries.

Table I.—Heat resistant propellants

|  | No. 1 | No. 2 |
|---|---|---|
| Potassium Perchlorate, wt. percent | 84 | 84 |
| Hycar 1051, wt. percent | 12 | 7.8 |
| Triallyl Cyanurate, wt. percent | 3.8 | 7.8 |
| Luperco ATC, wt. percent | 0.2 | 0.4 |
| Total | 100.0 | 100.0 |
| Properties: |  |  |
| Observed Heat of Explosion (cal./gm.) | 1,327 | 1,320 |
| Observed Density (gm./cc.) | 1.97 | 2.02 |
| Wt. Loss after 5 Hrs. at 400° F., percent | 1.59 | 2.99 |

The Hycar 1051, triallyl cyanurate and Luperco ATC comprised the binder whereas the potassium perchlorate, for example, constitutes the oxidizer, which we have determined may range from between about 72 to 87.5 weight percent. Of the entire fuel binder system, the effective range of the binder is as follows:

Table II.—Effective binder ranges

Hycar 1051, wt. percent _____ 49–75
Triallyl cyanurate, wt. percent _____ 24–49
Luperco ATC, wt. percent _____ 1.25–2.50

The method of preparing propellants in accordance with our invention is as follows:

The Hycar 1051 is placed in a suitable mixer until well macerated. Triallyl cyanurate and Luperco ATC are then added to the Hycar 1051 and further mixed until the entire binder is uniform. The oxidizer, wetted with a suitable solvent, such as methyl ethyl ketone, for example, is next added to the binder in two or more increments and thoroughly mixed therein. The entire mixture was then removed from the mixer and placed in a 2-inch extrusion press. The mixture was then extruded through a 0.202 inch–0.015° (7 pin) dye and was granulated to 2.02 cuts per inch on a small arms cutter. The granules (7 perforations) were then dried for about 48 hours at 55° C. to remove the volatile solvent. After this, the granules were cured about three hours at a temperature of about 300° F. in a rotating sweetie barrel and graphite glazed, as required.

With reference to the foregoing preparation, the extrusion pressure was about 1000 p.s.i. No difficulty was encountered in granulating on a conventional small arms cutter.

The propellants of our invention may be manufactured utilizing conventional smokeless powder equipment and in granule or grain size and with perforations as desired. The individual grains may have an outer diameter as small as about 0.5 inch, or, if desired, an outer diameter of about 0.6 inch. Perforations may vary from a central mono-perforation in smaller diameter grains to generally 7 or 19 perforations in the larger diameter grains. The limitation of outer diameter is one of solvent removal. Thus, substantially the same parameters for grain size and web exist as between this invention and the conventional solvent process for the manufacture of smokeless powder, since it has long been recognized that in driving conventional propellants with large webs, grain porosity usually results, and the drying time becomes inordinately long.

The utility and advantages for our invention are to be found in widespread applications which require the ability of the propellant grains to be subjected to elevated temperatures to about 400° F. This important advantage is obtained principally by the utilization of triallyl cyanurate which serves as a cross linking agent to provide a 3-dimensional network, the triallyl cyanurate imparting heat-resistant properties to the propellant and yet being devoid of brittleness associated therewith.

Since modifications of the invention will be apparent to those skilled in the art, it is intended that the scope of the invention be limited only by the appended claims.

We claim:

1. A propellant composition capable of resisting elevated temperatures for extended periods consisting essentially of
    about 72 to 87.5 weight percent of an oxidizer,
    the balance comprising a binder of 49–75 weight percent of a copolymer of about 60% butadiene and 40% acrylonitrile, 24–49 weight percent of triallyl cyanurate and 1.25–2.5 weight percent of a catalyst comprising benzoyl peroxide and tricresyl phosphate.

2. The composition of claim 1 wherein said oxidizer is potassium perchlorate.

3. The composition of claim 1 wherein said oxidizer is HMX.

4. A propellant composition capable of successfully withstanding 400° F. for a period of about five hours with a weight loss of only 1.5%, said composition consisting essentially of
    about 84 weight percent of potassium perchlorate,
    about 12 weight percent of a copolymer of 60% butadiene and 40% acrylonitrile,
    about 3.8 weight percent of triallyl cyanurate, and
    about 0.2 weight percent of a catalyst of benzoyl peroxide and tricresyl phosphate.

5. A propellant composition capable of successfully withstanding 400° F. for a period of 5 hours with a weight loss under 3 percent, said composition consisting essentially of
    about 84 weight percent of potassium perchlorate.
    about 7.8 weight percent of a copolymer of 60% butadiene and 40% acrylonitrile,
    about 7.8 weight percent of triallyl cyanurate, and
    about 0.4 weight percent of a catalyst of benzoyl peroxide and tricresyl phosphate.

6. A fuel-binder system for use with an oxidizer in providing heat-resistant propellant compositions consisting essentially of about
    49 to 75 weight percent of a copolymer af about 60% butadiene and 40% acrylonitrile,
    about 24 to 49 weight percent of triallyl cyanurate, and
    about 1.25 to 2.5 weight percent of a catalyst comprising benzoyl peroxide and tricresyl phosphate.

References Cited by the Examiner

UNITED STATES PATENTS 3,152,027   10/1964   Godsey _____ 149—83
3,154,449   10/1964   Ives _____ 149—19

BENJAMIN R. PADGETT, *Acting Primary Examiner.*